(12) United States Patent
Deal

(10) Patent No.: US 7,263,500 B2
(45) Date of Patent: Aug. 28, 2007

(54) SYSTEM, METHOD, AND DEVICE FOR GRAPHICALLY LOCATING MERCHANDISE

(75) Inventor: Steven A. Deal, Spring Valley, CA (US)

(73) Assignee: Indyme Electronics, Inc., San Diego, CA (US)

( * ) Notice: Subject to any disclaimer, the term of this patent is extended or adjusted under 35 U.S.C. 154(b) by 534 days.

(21) Appl. No.: 10/646,071

(22) Filed: Aug. 22, 2003

(65) Prior Publication Data

US 2005/0044011 A1 Feb. 24, 2005

(51) Int. Cl.
*G06Q 30/00* (2006.01)
(52) U.S. Cl. .................. 705/26; 705/1; 705/27
(58) Field of Classification Search ............... 705/26, 705/27, 1
See application file for complete search history.

(56) References Cited

U.S. PATENT DOCUMENTS

| | | | |
|---|---|---|---|
| 6,000,610 A * | 12/1999 | Talbott et al. | 235/383 |
| 6,381,583 B1 * | 4/2002 | Kenney | 705/26 |
| 7,010,501 B1 * | 3/2006 | Roslak et al. | 705/26 |
| 2002/0010655 A1 * | 1/2002 | Kjallstrom | 705/27 |
| 2002/0035512 A1 * | 3/2002 | Pavlik | 705/26 |
| 2002/0072974 A1 * | 6/2002 | Pugliese et al. | 705/14 |
| 2002/0174021 A1 * | 11/2002 | Chu et al. | 705/26 |
| 2002/0178013 A1 * | 11/2002 | Hoffman et al. | 705/1 |
| 2003/0004831 A1 * | 1/2003 | Owens | 705/26 |
| 2004/0153371 A1 * | 8/2004 | Razumov | 705/26 |
| 2004/0222302 A1 * | 11/2004 | Matsumori | 235/472.01 |

FOREIGN PATENT DOCUMENTS

CA 2338926 * 9/2001

OTHER PUBLICATIONS

Author unknown, "Home Depot Launches "Customer-Driven" Internet Strategy With New Web Site," Canada NewsWire, Ottawa, Jun. 30, 1999, p. 1.*

* cited by examiner

*Primary Examiner*—Jeffrey A. Smith
*Assistant Examiner*—Jason B. Dunham
(74) *Attorney, Agent, or Firm*—Knobbe Martens Olson & Bear LLP

(57) ABSTRACT

A system and method for graphically locating merchandise. An interactive display can present a high level environment displaying various categories of merchandise in a mapped image. A user can highlight a portion of the mapped image and navigate to a lower level environment displaying a subset of categories associated with the highlighted portion in another mapped image. The user can continue to navigate through increasingly detailed environments until a desired product is located. In one embodiment, a computer system associated with the interactive display identifies a store location where the desired product or goods similar to the desired product may be found. In another embodiment, the computer system allows the user to locate a plurality of desired items and provides the user with a store map locating all of the desired items and illustrating a path from the interactive display to the desired items.

16 Claims, 6 Drawing Sheets

SYSTEM, METHOD, AND DEVICE FOR GRAPHICALLY LOCATING MERCHANDISE

BACKGROUND OF THE INVENTION

1. Field of the Invention

The invention relates to the field of merchandise displays. More particularly, the invention relates to a graphical merchandise locator.

2. Description of the Related Art

Among the most common shopper frustrations in many of today's large stores is the effort it takes to find the desired merchandise. This often involves hunting down a store employee, which in itself can be a fruitless challenge. Some retailers have attempted to solve this problem with kiosks for shoppers to use. Retailer provided kiosks have not proven very effective and have not been rolled out to a significant number of stores. The primary shortcoming of these has been the rather unfriendly interface between the machine and the shopper. In virtually all known merchandise finder kiosks, the shopper is prompted to enter the descriptive name of the desired item and then to pick from a list of specific items falling within the scope of that, or a similar name. There are a few problems with this approach. There is often more than one term that describes the same product and it is difficult to capture all possible names or terms that shoppers might enter. Some shoppers refer to some products by trade names. Referring to items by their trade names further complicates the construction of such an interface.

In the case of some products, most people don't know the name of the product. This can be especially true in home center environments where the shopper may not be intimately familiar with the names of the desired item. For example, the "grill" that serves as the air outlet in a typical home forced air system is properly called a "register", but few shoppers would know this. Additionally, a surprisingly large percentage of the population has poor spelling skills. Further aggravating the ability of a merchandise locator to identify a desired product is that English is not a first language for a significant percentage of the population.

In short, these challenges, and the inherent dullness of the spell and list method, have failed to attract a significant number of shoppers to use merchandise kiosks, even though finding merchandise persists as a problem.

SUMMARY OF THE INVENTION

A system and method are disclosed for graphically locating merchandise. An interactive display can present a high level environment displaying various categories of merchandise in a mapped image. A user can highlight a portion of the mapped image and navigate to a lower level environment displaying a subset of categories associated with the highlighted portion in another mapped image. The user can continue to navigate through increasingly detailed environments until a desired product is located. Thus, the user can drill down through increasingly detailed images to locate a desired item.

In one embodiment, a computer system associated with the interactive display identifies a store location where the desired product or goods similar to the desired product may be found. In another embodiment, the computer system allows the user to locate a plurality of desired items and provides the user with a store map locating all of the desired items and illustrating a path from the interactive display to the desired items.

BRIEF DESCRIPTION OF THE DRAWINGS

The above-described aspects and other aspects, features and advantages of the invention will be apparent upon review of the following detailed description and the accompanying drawings. In the drawings, like reference characters identify identical or functionally equivalent elements.

DETAILED DESCRIPTION OF EMBODIMENTS OF THE INVENTION

Figure 1:
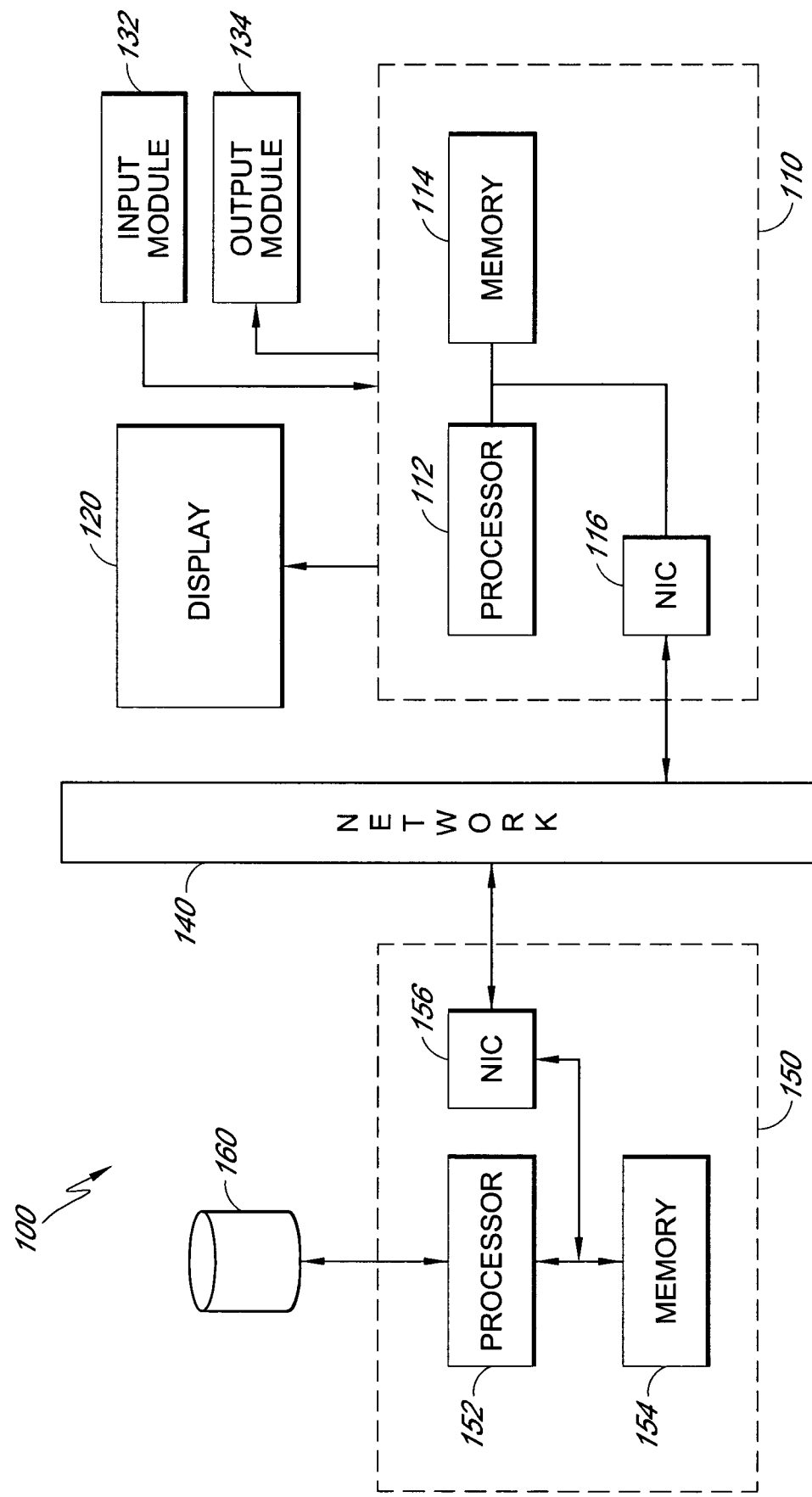
FIG. 1 is a functional block diagram of a computer system configured according to one aspect of the invention.

A merchandise locator system and method can be embodied in a computer system coupled to an interactive display. The merchandise items are grouped in categories that are graphically depicted at various levels in a hierarchical merchandise locator. A user can begin searching for a desired item at a high level and drill down through the hierarchical categories until the desired item is located.

The interactive display can initially show a high level view of an environment in which available products are used. The high level view is typically graphical and does not rely on text. The high level view can illustrate general groupings of categories of merchandise. The high level view may include a mapped image that relates a portion of the display to another lower level view of available products.

A user can operate the interactive display to select a category in the high level view. A user selection navigates the user to a lower level view in which sub-categories of available products are identified and displayed. The user can continue to navigate through varying levels of mapped images to locate a desired product without having to enter any text or respond to any displayed text. The user may then prompt the computer system to produce additional information relating to the desired product.

The additional information can include product specifications as well as information regarding the location of the product within a store. If the user navigates and selects multiple items, the computer system can provide a map of the store and locations of each of the items in the store. Additionally, the computer system may provide a path leading the user from the interactive display to each of the selected items.

For example, in big box retailers, such as home improvement centers, a vast array of merchandise is typically available. A merchandise locator kiosk may be provided in such a store to facilitate location of desired items. An interactive display in the kiosk may initially display an image of a residence, showing a house, driveway, yard, deck, pool, and other typical residential items. The images are typically graphical in nature and are such that a typical user can identify the images without requiring text or an associated description. The image may be a mapped image and each of the items depicted in the image may be a link to a lower level grouping of merchandise. For example, the image of the house may be associated with sub-categories of merchandise associated with a house. The image of the pool may be associated with sub-categories of merchandise associated with a pool.

A user may, for example, select the image of the house. In one embodiment, a user can select an item by pointing to the item and clicking a button on a mouse. In another embodiment, the user can select an item by touching a mapped area on a touch screen. In still another embodiment, the user can select an item by initially highlighting the item and then confirming it, such as by highlighting an image on a display and pressing a mouse button. The interactive display may then present a cut away image of a house showing, for example, typical rooms within a house as well as typical structure associated with a house.

The rooms can include, for example, a living room, kitchen, bedrooms, bathrooms and service area. The structure can include, for example, a roof, frame, heating and air conditioning, electrical, plumbing, and other structural items. The display may be a mapped image that navigates the user to an even lower level of detail.

Thus, a user that selects the portion of the display mapped to the kitchen may navigate to another image that displays details in a typical kitchen. The image represents a lower level of categorization, representing, in this example, a kitchen. A kitchen image, and thus category, may include cabinets, appliances, sinks, faucets, counter tops, and other kitchen items. Again, the kitchen image may be a mapped image that allows the user to navigate and select items within the image.

A user may then select one of the items in the image. The system may continually display increasingly detailed views of the selected image until no further navigation images are available. Alternatively, a user may indicate that an image at a particular level of categorization represents the desired image. For example, if a user selects a faucet in the kitchen image, the interactive display may display a more detailed image of a faucet. The more detailed view may include, for example, handles, valves, washers, aerators, seats, or other faucet parts. Additionally, the interactive display may provide a view that indicates, when selected, that the desired item is the faucet and not the parts of the faucet.

Once the user identifies the desired item, the system associated with the interactive display may provide a map identifying the location of the desired item within the store. In one embodiment, the system may provide the user with a map showing a path through the store leading from the interactive display to the desired item. In another embodiment where the user has selected multiple items, the system may provide the user with a map showing a path through the store leading from the interactive display to a first desired item and then from the first desired item to other desired items in the store. In another embodiment, the user can identify and purchase merchandise using the navigation system.

If the user requests a map for several items of merchandise, the system may provide a map that shows a path to take to pick up each of the items. For example, the system can provide a map that shows the shortest distance through the store leading to each of the items. Alternatively, the system may provide a map showing a logical path for retrieving the merchandise. For example, if the user selects the merchandise to build a deck, the system can map a path that takes the user to the hardware, paint and such prior to directing the user to the lumber. In this manner, the system provides a logical path because, even though the lumber may be the closest merchandise to the user, it is very inconvenient for a customer to physically navigate the store with a load of lumber. Thus, the system can provide a map based on logical ranking of the selected items.

FIG. 1 is a functional block diagram of a system 100 that can be configured to provide graphical merchandise location. The system 100 includes a user accessible computer 110 coupled to a display 120, input module 132, and output module 134. The user accessible computer 110 includes a processor 112 coupled to a memory 114 and a network interface card 116.

The network interface card 116 couples the user accessible computer 116 to a network 140, which may be a Wide Area Network (WAN), Local Area Network (LAN), Metropolitan Area Network (MAN), wireless network such as an IEEE 802.11 Wireless LAN, and the like or some other means for interfacing multiple computers.

A back-end computer 150 is also connected to the network 140 and is typically placed in a location that is inaccessible to most users. The back-end computer 150 typically includes a processor 152 and memory 154. The back-end computer 150 can also connect to the network using a network interface card 156. The back-end computer 150 can also be coupled to a database 160 that can include, for example, the Stock Keeping Units (SKUs) for each of the merchandise items locatable using the system 100. In one embodiment, the database can be organized using a standard retail-oriented database model known as an ARTS model. In another embodiment, other item identification is used. For example, a manufacturer's part number may be used to identify an item of merchandise, a model number, part number, proprietary numbering system, and the like or some other means for identifying the merchandise can be stored in the database and used to identify the merchandise.

Although only one user accessible computer 110 is shown in the system 100, one or more user accessible computers 110 can be connected to the same network 140. When multiple user accessible computers 110 are used, each user accessible computer 110 can be placed in a separate physical location in a business or one or more user accessible computers 110 can be co-located in a central location.

The user accessible computer 110 along with the associated display 120 and input and output modules 132 and 134 can be implemented in a single kiosk or other cabinet. Typically, only portions of the display 120, the input module 132 and the output module 134 are exposed to the user.

In another embodiment, the user accessible computer 110 is a user's home computer and the network 140 is the Internet. Thus, the user can use a personal computer to identify and select merchandise available from a store and find the location of the identified merchandise in the store prior to visiting the store.

In still another embodiment, a user can access the user accessible computer 110 to identify and select merchandise for purchase. A user may not be interested in locating an item of merchandise within a store. However, the user may be interested in identifying and purchasing merchandise and can use the system 100 to facilitate identifying and purchasing the merchandise. The user accessible computer 110 can be a terminal that allows the user to select and purchase special order items that are typically not stocked within the store. Graphically identifying and purchasing merchandise is particularly advantageous where the user accessible computer 110 is a user's home computer and the network 140 is the Internet. In one such embodiment, a user can remotely identify and purchase items from a retailer using a graphical navigation technique.

A user seeking to locate a particular item within a business can operate the user accessible computer 110 via the display and input module 132 to find the item. The user accessible computer 110 displays a graphical representation of merchandise categories on the display 120. The graphical representation can be a view of an environment in which available goods may typically be found. The processor 112 may initially control the display 120 to show a high level graphical representation. Typically, the graphical representation is relatively devoid of text.

The user can then operate the input module 132 to highlight and select an item on the display 120. The user selection is received by the processor 112 and relayed to the back-end computer 150 using the network 140. The back-end computer 150 can identify the current level of categorization shown on the display 120 and can access the database 160 to identify lower levels of categorization corresponding to the user input. That is, the user input typically corresponds to a request for a lower level, or more detailed categorization of merchandise. The lower level of categorization can be another graphical representation.

The back-end computer 150 can retrieve the lower level graphical representation from a database 160 and transmit the updated graphical representation to the user accessible computer 110, which then presents the image on the display 120. By navigating through successively more detailed graphical representations, the user can drill down through a hierarchy of graphical categories to identify and locate a desired item.

Alternatively, the user accessible computer 110 may periodically access, or be provided, data and information from the back end computer 150 and database 160. Then, the user accessible computer 110 can perform the majority of the user interface, database access, and control functions that are described above. Thus, in one embodiment, the user accessible computer 110 and the back end computer 150 can be the same computer. In other embodiments, the various tasks performed by the user accessible computer 110 and the back end computer 150 can be distributed across additional computers. The allocation of tasks to computers is not a limitation and many different computer configurations are possible.

Once the desired item is located, the user can instruct the user accessible computer 110 to provide further information regarding the desired item. For example, the user can request a map or location of the desired item within the store. The user accessible computer 110 can then produce a store map showing the location of the desired item. The user accessible computer 110 can provide the user a copy of the map via the output module 134. Alternatively, the user can purchase the item by entering, for example, a credit card number.

The user accessible computer 110 can be configured to perform minimal operations to enable a simple, low cost, processor 112 and memory 114 configuration to be used within the user accessible computer 110. The memory 114 can include processor readable instructions that direct the processor to perform a series of functional steps. For example, the memory 110 can include processor readable instructions that direct the processor 112 to control the display 120 and output module 134 and to receive user input from the input module 132.

The display 120 can be any type of display, such as, a monitor, a CRT, an LCD, a touch panel, a projection screen, and the like, or some other means for display. The processor 112 can control the display 120 to present graphical representations of categories that the user can navigate through to locate a desired item.

The user can control the input module 132 to select a desired item or category shown on the display 120. The input module 132 can be a keyboard, mouse, touch pad, joystick, track ball, pointer, pen, optical device, bar code laser reader, and the like, or a combination of input devices, or some other means for inputting. The input module 132 need not be limited to accepting manual user input, but can be configured to accept electronic input. For example, the input module 132 can also be a data port, an IR receiver, a disk drive, an optical receiver, a radio receiver, or some other electronic input or combination of input devices. The input module 132 can be separate from the display 120 or can be integrated with the display 120, such as when the display 120 is a touch screen.

The output module 134 can be a printer, plotter, electronic output device, and the like, or some other means for output that can provide the desired user information. In one embodiment, the output module 132 is a printer implemented in a kiosk that is controlled by the processor 112 to output a map indicating the location of a desired item. The output module 134 can be configured such that only the map or electronic output is available to the user. For example, paper maps printed by an output module 134 may be presented to the user through a slot or window in a kiosk.

Figure 2:
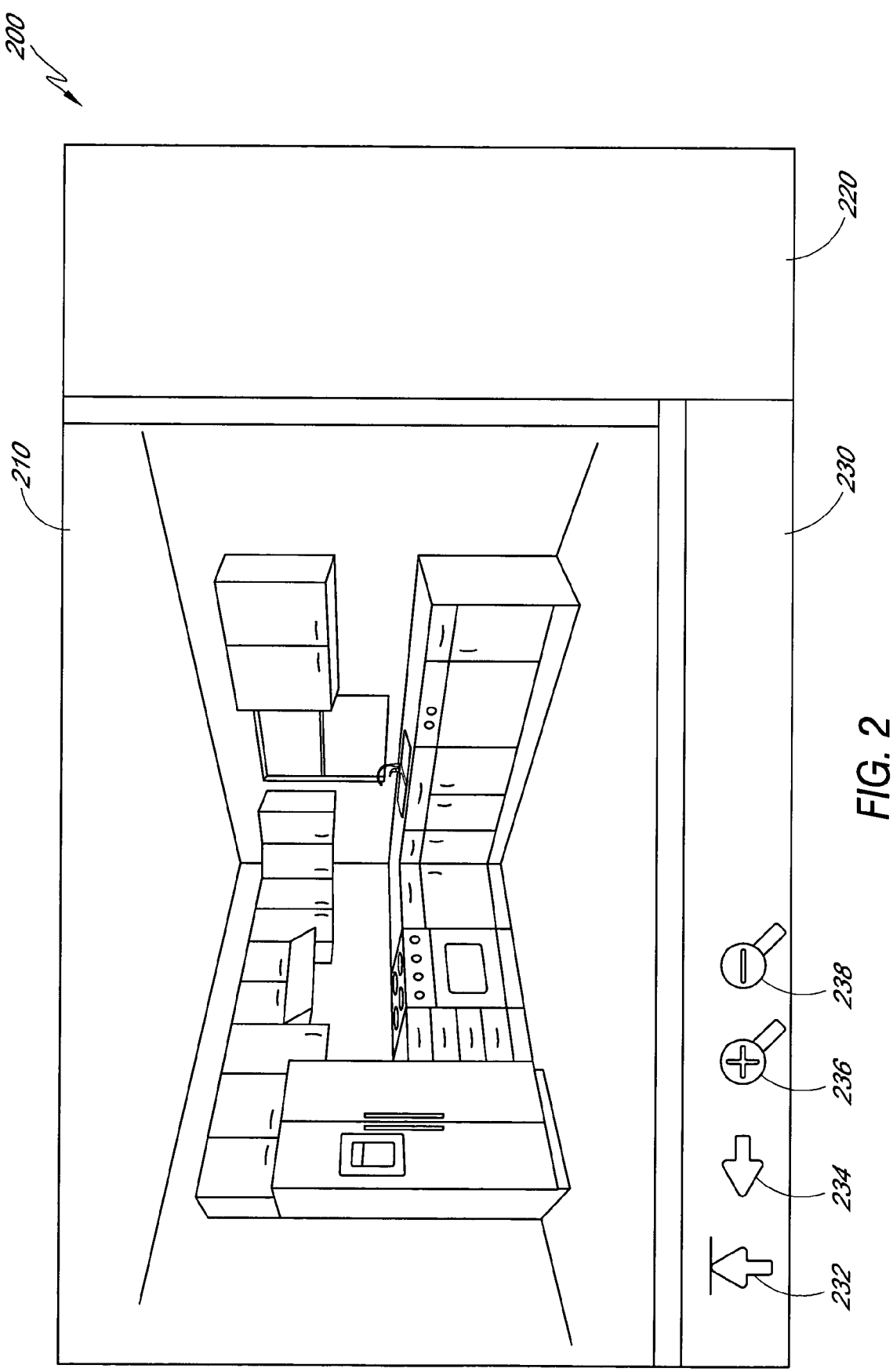
FIG. 2 is a functional representation of an interactive display.

FIG. 2 is a functional representation of one embodiment of a display output 200. Various other display outputs can be used. The display output 200 can be provided to the user, for example, on the display 120 of FIG. 1. The display output 200 can include a main display area 210, a detail area 220, and a toolbar area 230.

A main display area 210 can be used to display the interactive graphical image. The interactive graphical image can be an image of a typical environment in which available merchandise may be used. For example, a top level interactive graphical image may be an overhead view of a typical residential lot.

The interactive graphical image can be a mapped image whereby particular portions of the graphical image are mapped to an input function. Thus, the interactive graphical image can be mapped to categorize available merchandise into the images shown in the environment. For example, in the graphical image of a residential lot, a home and landscape area may be shown. The image of the home may be a mapped image that, when selected, navigates, or drills down, to a lower level. The lower level can be a more detailed image that shows an environment where home-related merchandise can be found. Similarly, the image of the landscape area can be an image that maps to a function that, when selected, drills down to a more detailed image that shows an environment where landscape related merchandise can be found. Thus, the mapped images in the interactive display can correspond to categories of merchandise.

The detail area 220 can include general information or information that is associated with the particular image shown in the main display area 210. In one embodiment, the detail area 220 provides additional information relating to one or more items in the main display area 210. For example, the detail area 220 can provide listings of models or brands associated with an item that a user highlights in the main display area 210. Additionally, the detail area can include links to related merchandise or can show or link to application information, such as "how to" guides and other instructional information.

In another embodiment, the detail area 220 provides brand name advertising for merchandise or services associated with the image displayed on the main display area 210. For example, if the main display area 210 shows plumbing fixtures, the detail area 220 can include advertisements for particular brands of fixtures. The detail area 220 can also include information or advertisements relating to installation services.

The toolbar area 230 can include icons that relate to navigation and modification of the displayed image. Because the displayed images are typically organized in increasingly detailed views, the top level image typically represents the most general image. A return to top level icon or button 232 can be included in the toolbar to allow a user to return to the top level menu without navigating back through the drill down levels. The return to top level icon 232 can be particularly advantageous where multiple users have access to the merchandise locating system. A first user may abandon the locating system after navigating to a desired level. A second user that accesses the locating system immediately after the first user abandons the system may still view the last image remaining on the display after the first user abandons the system. However, this image may not correspond to the merchandise that interests the second user. The second user can easily select the return to top level icon 232 to quickly return to the typical starting point without having to navigate through the system.

A back arrow or icon 234 can be provided in the toolbar to return the user to the image that was displayed prior to the current image. The back arrow 234 allows the user to return to a higher level of categorization from a lower level of categorization. Other navigation icons can similarly be added to the toolbar area 230.

The toolbar area 230 can also include icons or buttons that perform image modification. For example, the toolbar area 230 can include a zoom-in icon 236 that instructs the system to increase the image size. Additionally, the toolbar area 230 can include a zoom-out icon 238 that instructs the system to decrease the image size. Of course, other image modification functions can be associated with other icons included in the toolbar area 230.

Figure 3:
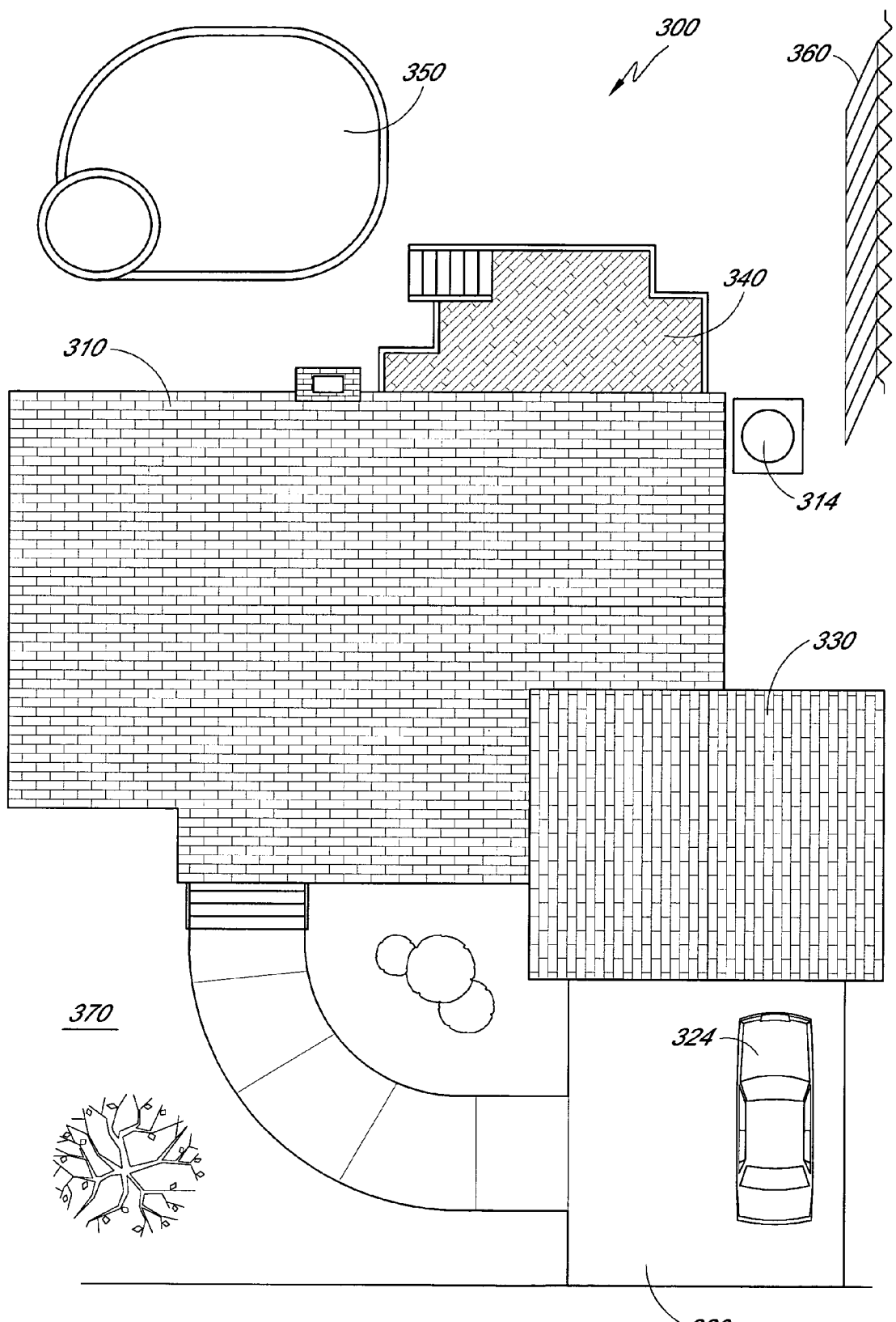
FIG. 3 is a functional representation of a top level display.

FIG. 3 is a functional representation of a top level image 300 that may be displayed in the main display area 210 of a display 120. The top level image 300 depicts an overhead view of a residential lot. The top level image 300 can be, for example, the initial image displayed to a user at a store such as a home improvement store or a home center. The top level image 300 can include various items generally associated with merchandise. For example, the top level image 300 includes a home 310, an air conditioning unit 314 next to the home 310, a driveway 320 having a car 324, a garage 330, a patio or deck 340, a pool 350, fencing 360, a lawn or other landscape 370, and the like. Of course the top level image 300 is not limited to just the items shown in FIG. 3, nor is the top level image 300 required to have all of the items shown in FIG. 3. For example, the top level image 300 can also include a garden shed, a garden, children's play equipment, and other environments associated with merchandise.

The top level image 300 can be a mapped image. Thus, an area of the image associated with the home 310 can link to a lower level image that details merchandise or environments associated with a home. Similarly, the portion of the image associated with the pool 350 may link to a different lower level image that details merchandise or environments associated with a pool.

Typically, the top level image 300 does not identify part or model numbers for actual products that may be available in the store. Instead, the top level image 300 typically provides an image of an environment, here a residential lot, associated with typical categories of merchandise available in the store.

A user selects a portion of the image associated with merchandise that the user desires to locate. For example, a user that desires home related merchandise can select the home 310. The process of selecting a portion of the image can include separate highlight and selection actions, or can be a single action including both highlighting and selecting. Additionally, some of the mapped images on the top level image 300 or any other display image may require separate highlight and selection actions while other mapped images require only a single action to select the item.

Once the user has selected a mapped image from the display, the system performs the function associated with the mapped image. For example, if the user selects the home 310, the system drills down to a lower level image associated with the home 310.

Figure 4:
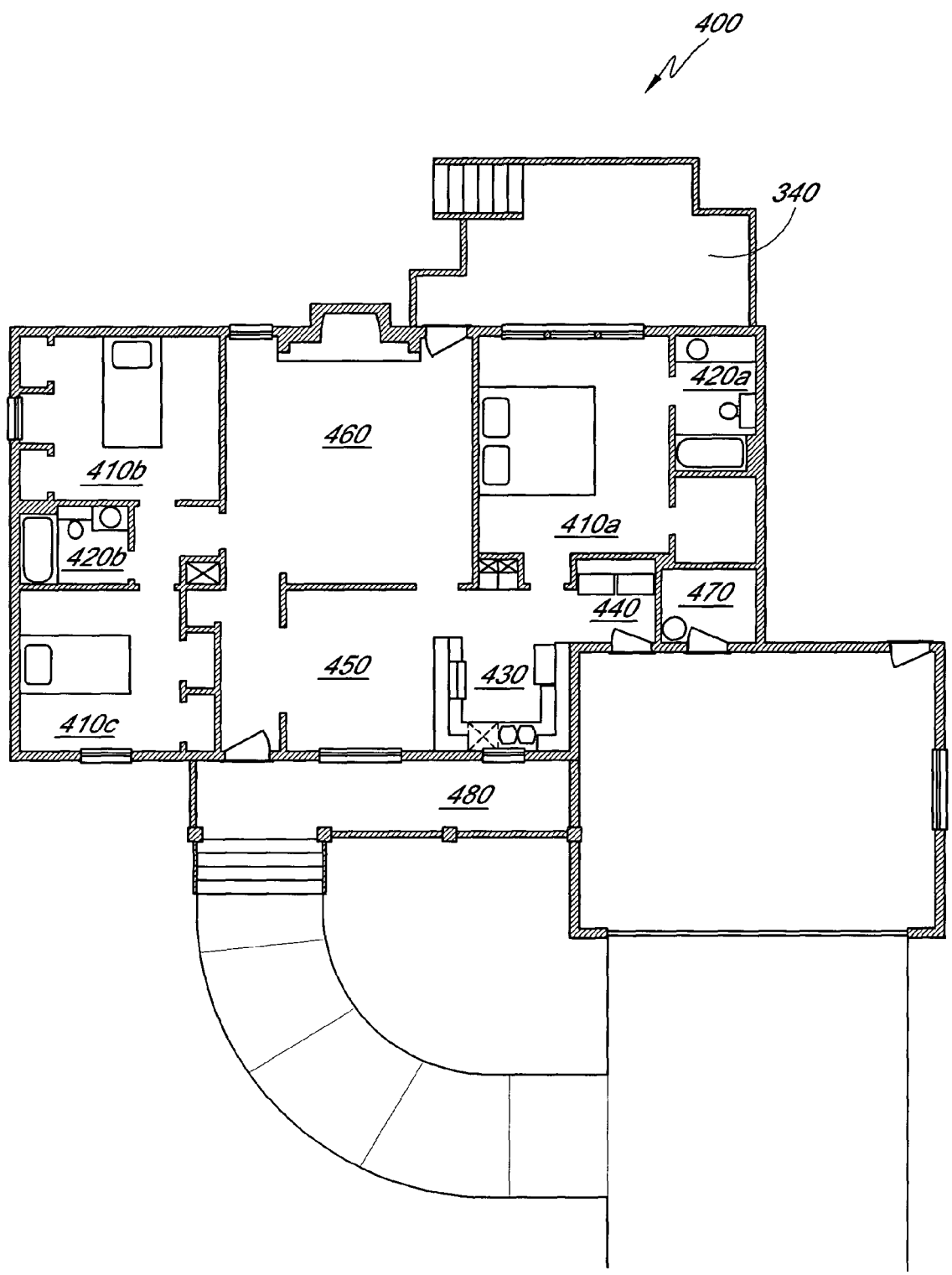
FIG. 4 is a functional representation of a lower level display.

FIG. 4 is a functional representation of a first lower level image 400 associated with the home 310 from the top level image 300 of FIG. 3. The outline of the home in FIG. 4 is not the same as the outline of the home 310 in FIG. 3. However, in other embodiments the shapes and outlines of the images in lower level images may correspond with the shapes and outlines from the upper level image.

Additionally, the lower level image of FIG. 4 duplicates some of the image portions shown in the upper level image. For example, the first lower level image 400 includes the deck 340 that is also shown in the top level image 300. In other embodiments, the lower level images can include zero, one, or multiple images from the upper level images.

The first lower level image 400 shows additional typical environments associated with merchandise. The environments shown in the first lower level image are typically more detailed than the environments shown in higher level images. Thus, a portion of the top level image 300 can be said to drill down to the first lower level image 400. For example, the first lower level image can include images of a bedrooms 410*a*-410*c*, bathrooms 420*a*-420*b*, kitchen 430, laundry room 440, dining room 450, living room 460, storage area 470 having a water heater, and front porch 480. The first lower level image 400 can also be a mapped image and portions of the image can link to a different display image. One or more of the image portions may map to the same lower level image. For example, each of the bedrooms 410*a*-410*c* may be a mapped portion of the image. The bedrooms 410*a*-410*c* can, for example, all map to the same lower level image because the type of merchandise that is applicable to one bedroom is typically applicable to all bedrooms. Alternatively, some of the portions of the image can map to the same lower level image and other portions may uniquely map to other lower level images.

A user can select a portion of the first lower level image 400 to drill down to an even more detailed image. For example, the user may select the kitchen 430. In response to the user's selection, the system may navigate to, and display the next lower image corresponding to the kitchen 430.

Figure 5:
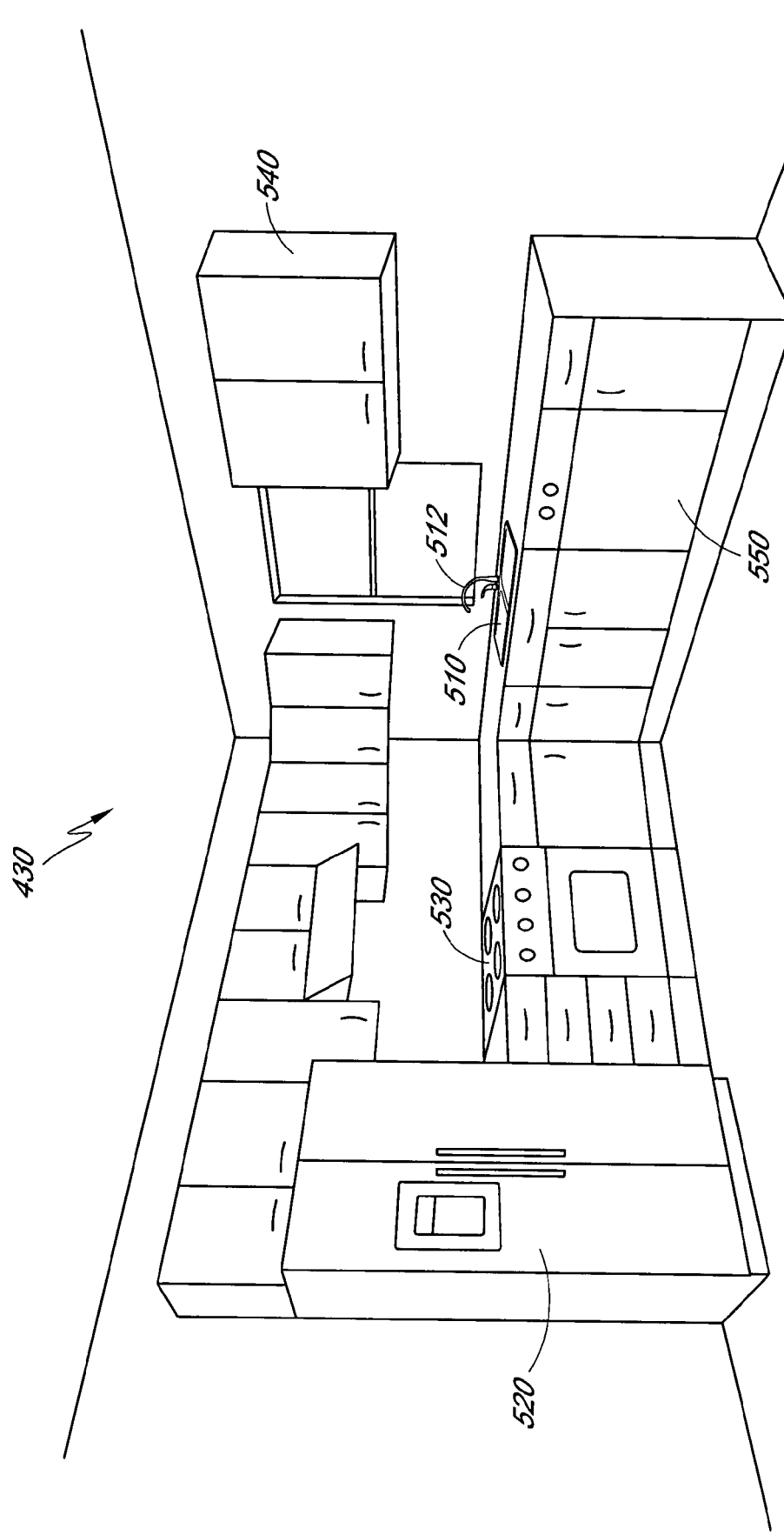
FIG. 5 is a functional representation of a lower level display.

FIG. 5 is a functional representation of one embodiment of the kitchen image 430 that is a lower level image. The system may drill down to the kitchen image 430 in response to user input selecting the kitchen 430 in the first lower level image 400 of FIG. 4. As was the case with the other graphical images, the kitchen image 430 can be a mapped image in which portions of the image map to predetermined functions.

The kitchen image 430 displays the type of merchandise that can typically be found in a kitchen. The mapped portions of the kitchen image 430 can include a sink, a faucet 512 that is positioned near the sink 510, a refrigerator 520, a range 530, and cabinets 540. Other kitchen items can similarly be displayed in the image. For example, the kitchen image 430 can display images for a variety of kitchen appliances, for example, a dishwasher, a freezer, a microwave oven, a trash compactor, a toaster, and other kitchen appliances. Additionally, the kitchen image 430 need not be a perspective image, but can be an overhead image, a wireline image, a 3D image, or some other representation. The images of the various kitchen items are shown as replicas of the merchandise. However, in this image and in the other displayed images, icons or other graphical representations may be used to represent the items. For example, in the kitchen image 430, an ice cube may be used to represent the freezer and a flame may be used to represent the range. Any graphical representation can be used to identify an item.

The user can select a portion of the kitchen image 430. The system can drill down to an even lower level of detail or can provide the user with information concerning the selected product. For example, at the top level image 300, the user may select the home 310. Because the retail outlet may not sell complete homes, the system may directly drill down to the lower level image of the home.

However, in lower level images, the selected item may be a product and may also be associated with lower level images that provide additional graphical detail. For example, the user may highlight or select the faucet 512 in the kitchen image 430. Faucets can be items that are sold in the retail outlet. Additionally, the user may not be interested in the actual faucet, but instead, may be interested in faucet parts. Because the retail outlet may also carry faucet parts, the faucet image 512 may also map to a lower level image that can show, for example, an exploded image of a typical faucet. An additional icon or button may be placed in, for example, the detail portion of the display, in order to allow the system to differentiate the two possible user choices. A user selection of the icon or button in the detail portion of the display may indicate that the highlighted or selected image is the merchandise the user is interested in.

The user can thus navigate through a series of graphical images to reach a desired item of merchandise. The user can then direct the system to provide a map showing the location of the desired item in the store. In one embodiment, the system displays a map from the display to the desired item in response to a user selecting a map icon in the detail portion of the display. In another embodiment, the user can select a print icon to direct the system to provide a hardcopy map of showing the location of the desired item in the store.

The user can locate a single item prior to mapping the item or can locate multiple items that can all be identified on a single map. The map can indicate, for example, the aisle number in the store where the desired item or items may be found. In another embodiment, the map can direct the user through the store to the location of the desired items. For example, a map can display a floor plan of the store and include a line that traces a path from the user display to one or more desired items.

The user may also direct the system to provide information, such as how-to information or related merchandise information, once a desired item is highlighted on the display. The user can similarly request the information be displayed or provided as a hardcopy.

Of course the system is not limited to identifying kitchen merchandise. The system can also be used to locate other types of merchandise. For example, a user may want to locate an air conditioning register but may not know the proper term for the item. However, the user knows that the item is located within the home and is associated with the air conditioning system.

The user may use a kiosk having the disclosed system that is located in a home improvement store. The user may initially start at a top level menu that displays a home, lawn, car, garage, garden shed, garden, children's play equipment, and other environments. Because the user knows the register is located in the home, the user selects the image of the home.

The system drills down to a more detailed image of a house. The system enlarges the image of the home to show the various rooms of a typical house. The image can also show images of structure associated with the whole house. Such structure can include the electrical, plumbing, and heating and air conditioning.

The user may see the image of an air conditioning duct or an air conditioning unit. The user can then select the image associated with the air conditioning portion of the home.

The system can then drill down to a lower graphical image that further details a typical air conditioning system. The image can show, for example, a central air conditioning system as well as a room air conditioning unit. The user may see that the register is located at the end of an air conditioning duct.

The user can then select the register. The system may then show details of the duct because the duct may not drill down to any more detailed views. The system can provide, for example, the name of the item, a listing of specific models the store carries, and the location of the item within the store.

Thus, a user can locate a desired item in a store without knowing the name of the item. The user need only know what environment the item is associated with and have a general idea as to the typical look of the item. The user is able to locate an item in a store by navigating increasingly detailed drill down displays of merchandise environments.

The system and method can also be used in other store types. In some cases, such as supermarkets, special detail would be provided in the kitchen. Once selected, it might appear as though one is in a kitchen. Some visual selectable items might include, for example, a spice rack, bread box, refrigerator, freezer, pantry, cupboard, etc. There might even be various common "in-process" foods displayed on a counter, such as representative vegetable, meat, and dairy products. Various creative means of displaying items could then be used once the user selects one of these images. For example, selecting the refrigerator might show the typical drawers (produce, meat, dairy, etc.) as well as a creative view representing the other types of items found in a refrigerator. The images can be as detailed as desired and the search can quickly be further refined through one or two more drill downs, if needed.

General merchandise stores could likewise show clothes closets, dressers, and other items in master bedrooms, children's rooms, dens, sewing rooms, etc. to permit locating virtually any merchandise within three or four drill-down levels. Even the medicine cabinet in the bathroom could expand to provide a wide selection of typical medications. Some images might even have brand names. Branding could apply in nearly all applications and could provide a revenue source from manufacturers for including the items in that fashion.

Figure 6:
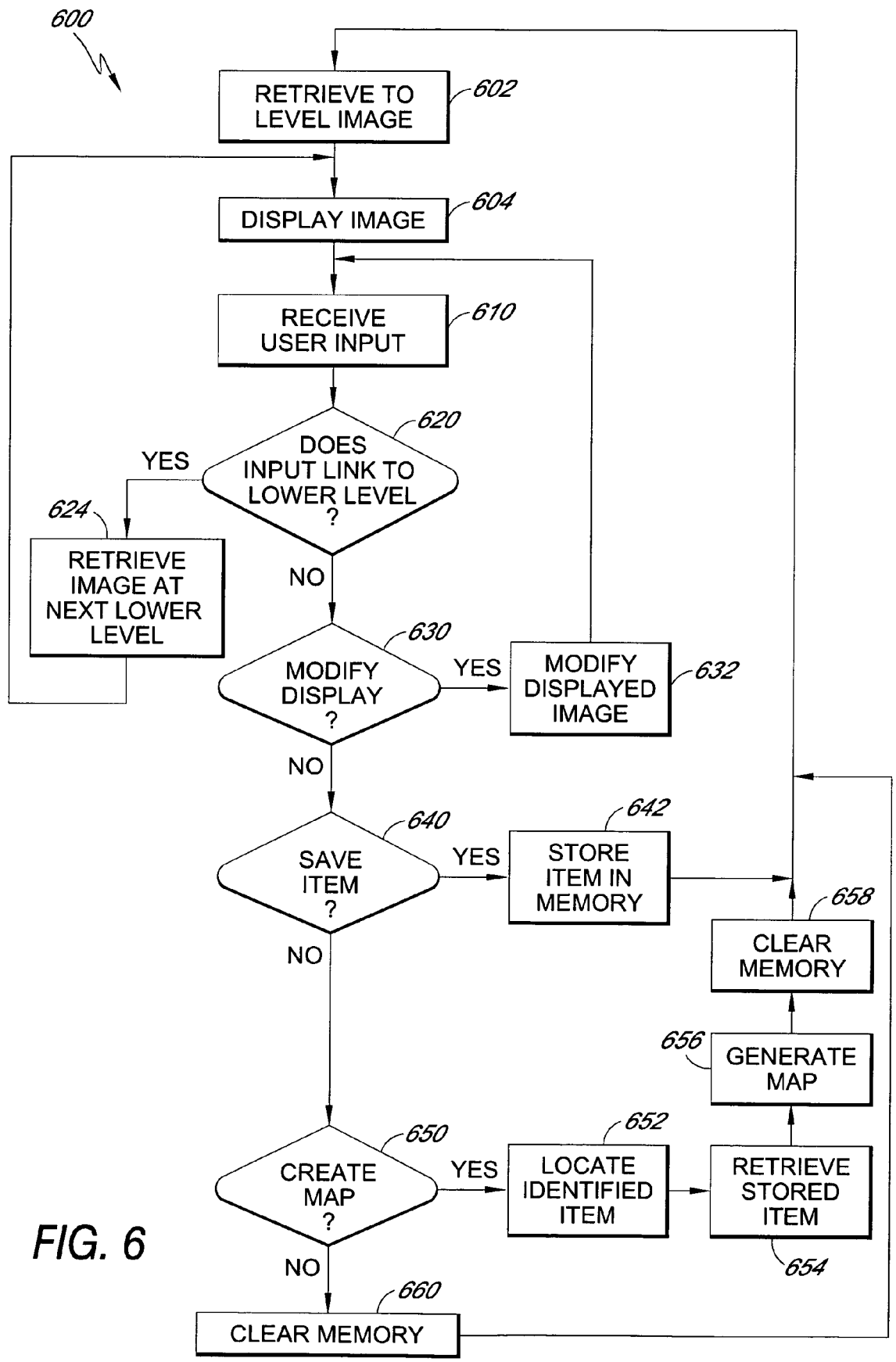
FIG. 6 is a flowchart of a merchandise location method.

FIG. 6 is a flowchart of a merchandise locating method 600. The method 600 can be, for example, embodied in one or more processor readable storage devices of the system shown in FIG. 2. Thus, the system of FIG. 2 may perform the method 600.

The system can initially begin at block 602 where the system retrieves a top level image from memory. The system then proceeds to block 604 where the image is displayed. As described above, the image can be a mapped image where one or more portions of the image correspond to functions performed by the system.

The system proceeds to block 610 where it receives user input. The user input can be from an input device such as a touch screen, a mouse, pointer, keyboard, or other means for inputting. After receiving the input, the system proceeds to decision block 620.

In decision block 620, the system analyzes the user input to determine if the user input relates to a system function that links to a lower level. That is, the system determines if the user input is a selection of an image portion that is associated with another drill down image.

If the user input requests the drill down image corresponding to the next lower level, the system proceeds to block 624 where the image associated with the user selection is retrieved from memory. The system then proceeds back to block 604 to display the image and await user input.

Returning to decision block 620, if the system determines that the user input does not link to a lower level image, the system proceeds to decision block 630 to determine if the user input instructs the system to modify the display. The user input can be, for example, a direction to zoom the display image in or out.

If the system determines the user input requests a display modification, the system proceeds to block 632 where the display image is modified according to the user input. If instead, the user input does not request modification of the display image, the system proceeds from decision block 630 to decision block 640.

At decision block 640, the system determines if the user input requests a desired item be saved. In this embodiment, the method 600 allows the user to navigate to a desired item and save the desired item in a memory. Then, the user can navigate and select other desired items and request the system identify the location of all selected items.

If the system, in decision block 640, determines the user input directs the system to save the current item, the system proceeds to block 642 where the identity of the item is stored in memory. The system can store, for example, the SKU, part number, model number, or some other merchandise identifier of the desired item. The system then proceeds back to block 602 where the top level image is again displayed. Of course, the system can be configured to return to some other lower level image.

If the user input does not correspond to a request to save the current item, the system proceeds from decision block 640 to decision block 650 where the system determines if the user command requests creation of a map.

If the user input requests the creation of a map, the system proceeds to block 652. In block 652, the system retrieves the identity of the current desired item and finds the location of similar items in the store. For example, if the user selection is an air conditioning register, the system finds the store location for registers. The location can be as general as a store aisle or can be more specific, including the aisle number, shelf, and general position on the shelf.

The system then proceeds to block 654 where previously stored items are retrieved from memory. The system also finds the positions corresponding to the previously stored items. The system then proceeds to block 656 where a map is generated identifying the location of one or more of the items selected by the user. For example, the map can show a path from the user display to the first item selected by the user. The map can also show a path that leads from the first item to subsequent items selected by the user. In another embodiment, the map can identify the aisles that correspond to each of the selected items. Other map configurations are available to help identify the locations of the selected items. The map can be displayed to the user or can be provided in a hardcopy format.

The generation of a map is typically considered the final function performed by the user. Thus, after creating the map in block 656, the system proceeds to block 658 where the memory is cleared of all previously identified user selections. This step minimizes the possibility that the memory will continue to hold contents chosen by a first user when a second user seeks to locate store merchandise.

After clearing the memory, the system proceeds back to block 602 where the top level image is retrieved in preparation of another user directed search.

Returning to block 650, if the system determines that the user input does not correspond to a request to create a map, the user input may have actually been created by a system time out. Such a system time out may occur when the system detects that no user input has occurred for a predetermined period of time. Inactivity can be, for example, due to a user abandoning a search without exiting from a lower level menu or without seeking a map.

Thus, the system may have a default response whereby the system returns to the top level menu in preparation of another user. The system proceeds from decision block 650 to block 660 where the memory is cleared of user selections. The system then loops back to block 602 where the top level image is retrieved in preparation of the next user.

Thus, an interactive graphical drill-down has been described for in-store or on-line merchandise shopping in the fashion described above. A user can identify and locate desired items by navigating graphical drill down images. The user can identify the desired item without ever using a text interface. Additionally, the user can identify an item without knowing the name of the item. The system can then locate the desired item, and items similar to the desired item, and create a map showing the location of the merchandise in the store. Alternatively, the user can graphically identify merchandise and purchase the merchandise, for example, using a remote computer.

The system may be incorporated in a kiosk in a store or can be accessed by a user having a network connection to the system. For example, the user can use a personal computer with an Internet connection to navigate to a system hosted by a retail store. The user can identify the particular store in which merchandise is to be located. For example, the user can identify a store location, such as by address, city, or street. Then, the user can navigate through the images to select and identify desired merchandise. The user can then request creation of a map locating the merchandise in the store. The user can then print the map using a printer and have the locations of desired goods identified prior to venturing to the store.

Electrical connections, couplings, and connections have been described with respect to various devices or elements. The connections and couplings may be direct or indirect. A connection between a first and second device may be a direct connection or may be an indirect connection. An indirect connection may include interposed elements that may process the signals from the first device to the second device.

Signal or process flows have been described with respect to various processes, methods, or flowcharts. The flow from one step or block to the next may be direct or indirect. An indirect connection may include interposed blocks that may process the signals from the one block prior to a subsequent block. Additionally, the arrangement of the blocks or steps shown in the figures is not necessarily an indication of order. The blocks, processes, steps, or methods may, in some instances, be re-ordered without affecting results of the process or methods.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The above description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A merchandise locating system, the system comprising:
   a display configured to present a graphical mapped image of a residential lot, the residential lot comprising at least a house and a landscape area adjacent at least a portion of the house, wherein the graphical mapped image comprises a representation of the house and the landscape area as viewed from outside the house;
   an input module configured to accept user inputs; and
   a user accessible computer coupled to the display and the input module, and configured to determine a portion of the graphical mapped image corresponding to the user input and to control the display to present a lower level graphical image of the determined portion of the graphical mapped image, the lower level graphical image comprising representations of one or more of a plurality of rooms of the house;
   the user accessible computer further configured to receive one or more inputs from the input module indicating a user selected portion of the lower level graphical image corresponding to a particular desired merchandise item and to determine a location in a store of the desired merchandise item, and to generate a map identifying the location in the store of the item, wherein the display presents an image of the map to the user.

2. The system of claim 1, further comprising:
   an output module coupled to the user accessible computer, and configured to provide an output identifying the location in the store of the desired item.

3. The system of claim 1, wherein the user accessible computer is further configured to generate a map identifying the location in the store of the item, and wherein the output module outputs a hardcopy of the map.

4. The system of claim 1, further comprising:
   a network coupled to the user accessible computer;
   a database; and
   a back-end computer coupled to the network and the database, and configured to receive an identity of the portion of the graphical mapped image from the user accessible computer and retrieve from the database the lower level graphical image, the back-end computer communicating the lower level graphical image to the user accessible computer using the network.

5. The system of claim 1, wherein the display comprises a device selected from the group consisting of a monitor, a CRT, an LCD, a touch panel, and a projection screen.

6. The system of claim 1, wherein the input module comprises a device selected from the group consisting of a keyboard, a mouse, a touch pad, a joystick, a track ball, a pointer, and a pen.

7. A system of locating merchandise in a store comprising a plurality of merchandise items, the system comprising:
   means for displaying a graphical mapped image of a residential lot comprising at least a house and a landscaping area proximate the house;
   means for inputting a user input and a desired merchandise selection;
   a user accessible computer coupled to the display and the input module, and configured to determine a portion of the graphical mapped image corresponding to the user input and to control the display to present a lower level graphical image corresponding to the portion of the graphical mapped image, the lower level graphical image comprising representations of one or more of a plurality of rooms of the house, the user accessible computer further configured to receive a second user input corresponding to a portion of the second graphical mapped image and to create a map identifying a location in the store of an item corresponding to the desired merchandise selection; and means for displaying the map.

8. The system of claim 7, wherein the means for outputting the map comprises the means for displaying the graphical mapped image.

9. The system of claim 7, wherein the means for outputting the map comprises a device selected from the group consisting of a printer, a plotter, and an electronic output device.

10. A method of selecting merchandise available in a store, the method comprising:
   displaying a first graphical mapped image on a display, the first graphical mapped image chosen from a hierarchy of graphical mapped images and depicting at least one of an exterior view of a house and a view of a plurality of rooms of the house;
   receiving a first user input corresponding to a portion of the first graphical mapped image;
   determining a second graphical mapped image from the hierarchy of graphical images based in part on the first user input, the second graphical mapped image comprising representations of one or more of a plurality of rooms of the house;
   receiving a second user input corresponding to a portion of the second graphical mapped image; and
   displaying a map on the display, the map indicating a location in a store of merchandise associated with the second user input.

11. The method of claim 10, further comprising displaying an image of the map.

12. The method of claim 10, further comprising outputting a hard copy image of the map.

13. The method of claim 10, wherein creating the map locating merchandise in the store comprises:
   determining the portion of the second graphical mapped image corresponding to the second user input;
   determining merchandise corresponding to the portion of the second graphical mapped image;
   determining an identifier corresponding to the merchandise; and determining a location of the merchandise based in part on the identifier.

14. The method of claim 13, wherein the identifier comprises a SKU.

15. One or more processor readable storage devices having processor readable code embodied on the processor readable storage devices, the processor readable code for programming one or more processors to perform a method of graphically locating merchandise, the method comprising:
   displaying a first graphical mapped image on a display, the first graphical mapped image chosen from a hierarchy of graphical mapped images, the first graphical mapped image depicting at least one of an exterior view of a house and a view of a plurality of rooms of the house;
   receiving a first user input corresponding to a portion of the first graphical mapped image;
   determining a second graphical mapped image from the hierarchy of graphical images based in part on the first user input, the second graphical mapped image comprising representations of one or more of a plurality of rooms of the house;
   receiving a second user input corresponding to a portion of the second graphical mapped image;
   creating a map illustrating locations of merchandise in the store based on the second user input, and
   displaying an image of the map on the display.

16. One or more processor readable storage devices having processor readable code embodied on the processor readable storage devices, the processor readable code for programming one or more processors to perform a method of graphically locating merchandise, the method of claim 15 wherein the second graphical mapped image comprises representations of one or more of a bedroom, a bathroom, a kitchen, a laundry room, a dining room, a living room, a storage area, and a garage of the house.

* * * * *